(12) United States Patent
Sharma et al.

(10) Patent No.: US 9,082,062 B2
(45) Date of Patent: Jul. 14, 2015

(54) METHOD OF, AND SYSTEM AND LABEL FOR, AUTHENTICATING OBJECTS IN SITU

(75) Inventors: Satya Prakash Sharma, East Setauket, NY (US); Xianfeng Gu, Plainview, NY (US); Robert James Hart, Frisco, TX (US)

(73) Assignee: ZORTAG, INC., Great Neck, NY (US)

( * ) Notice: Subject to any disclaimer, the term of this patent is extended or adjusted under 35 U.S.C. 154(b) by 357 days.

(21) Appl. No.: 13/269,726

(22) Filed: Oct. 10, 2011

(65) Prior Publication Data

US 2013/0087620 A1    Apr. 11, 2013

(51) Int. Cl.
| | | |
|---|---|---|
| G06K 7/10 | (2006.01) | |
| G06K 19/14 | (2006.01) | |
| G06K 19/06 | (2006.01) | |

(52) U.S. Cl.
CPC .......... *G06K 19/14* (2013.01); *G06K 19/06037* (2013.01)

(58) Field of Classification Search
USPC ........................................................ 235/454
See application file for complete search history.

(56) References Cited

U.S. PATENT DOCUMENTS

| | | | |
|---|---|---|---|
| 3,971,692 A | 7/1976 | Anderson | |
| 4,265,938 A | 5/1981 | Jack | |
| 5,059,245 A | 10/1991 | Phillips | |
| 5,729,365 A | 3/1998 | Sweatt | |
| 6,309,690 B1 | 10/2001 | Brogger | |
| 6,356,649 B2 | 3/2002 | Harkless | |
| 6,647,649 B2 | 11/2003 | Hunt | |
| 7,380,128 B2 | 5/2008 | Bourrieres | |
| 7,687,271 B2 | 3/2010 | Gelbart | |
| 7,831,042 B2 | 11/2010 | Stierman | |
| 7,885,428 B2 | 2/2011 | Stierman | |
| 2006/0091208 A1* | 5/2006 | He et al. ........................ 235/385 |
| 2007/0023494 A1 | 2/2007 | Haraszti | |
| 2007/0199991 A1* | 8/2007 | Haraszti et al. ............... 235/454 |
| 2008/0231418 A1 | 9/2008 | Ophey | |
| 2009/0035520 A1 | 2/2009 | Sagar | |
| 2009/0153841 A1 | 6/2009 | Ophey | |
| 2010/0052308 A1* | 3/2010 | Balinsky et al. ................ 283/70 |

(Continued)

FOREIGN PATENT DOCUMENTS

| | | |
|---|---|---|
| EP | 1477940 A2 | 11/2004 |
| GB | 2453992 | 4/2009 |

(Continued)

OTHER PUBLICATIONS

G. Simmons, "A Survey of Information Authentication", Proceedings of the IEEE, vol. 76, No. 5, pp. 603-620, May 1988.

(Continued)

*Primary Examiner* — Rafferty Kelly
(74) *Attorney, Agent, or Firm* — Kirschstein, et al.

(57) ABSTRACT

A method of, and a system and a label for, authenticating an object in situ create an authentication pattern signature for the object to be authenticated, associate a random distribution of multiple, three-dimensional elements with the object, aim a portable, handheld, image capture device at the object to capture return light from the elements as a single image, verify from the single image that the elements are three-dimensional, process the single image to generate an image pattern of the elements, compare the image pattern with the authentication pattern signature, and indicate that the object is authentic when the image pattern matches the authentication pattern signature.

14 Claims, 3 Drawing Sheets

(56) References Cited

U.S. PATENT DOCUMENTS

2010/0327050 A1 12/2010 Stierman
2010/0327060 A1 12/2010 Moran

FOREIGN PATENT DOCUMENTS

| WO | 0250790 | 6/2002 |
| WO | 2005104008 | 11/2005 |
| WO | 2006016114 | 2/2006 |
| WO | 2007133163 | 11/2007 |

OTHER PUBLICATIONS

G. Simmons, "Identification of data, devices, documents and individuals", IEEE International Carnahan Conference on Security Technology, 1991, pp. 197-218.
R. Pappu, "Physical one-way functions", Ph.D. Thesis, MIT, 2001, Physical One-Way Functions.
R. Pappu, et al. "Physical one-way functions", Science, vol. 297 (No. 5589) pp. 2026-2030, 2002.
C. N. Chong, D. Jiang, J. Zhang, L. Guo, "Anti-counterfeiting with a Random Pattern", Emerging Security Information, Systems and Technologies, 2008. SECURWARE '08. Second International Conference on, vol., no., pp. 146-153, 2008.
M. J. Brooks and B. K. P. Horn, "Shape and source from shading", Proceedings of International Joint Conference on Artificial Intelligence, pp. 932-936, 1985.
J. Malik and D. Maydan, "Recovering Three-Dimensional Shape from a Single Image of Curved Objects", IEEE Transaction on Pattern Analysis and Machine Intelligence, vol. 11, No. 6, pp. 555-566, 1989.
M. Daum and G. Dudek, "On 3-D Surface Reconstruction Using Shape from Shadows", IEEE Conference on Computer Vision and Pattern Recognition (CVPR), 1998.
G. Wei and G. Hirzinger, "Learning Shape from Shading by a Multilayer Network", IEEE Transactions on Neural Networks, vol. 7, No. 4, pp. 985-995, 1996.
Y. Yamashita, F. Sakaue and J. Sato, "Fast 3D Shape Recovery from Shadows Projected on Arbitrary Curved Surfaces", The International Journal of Virtual Reality, vol. 9, No. 1, pp. 1-6.

\* cited by examiner

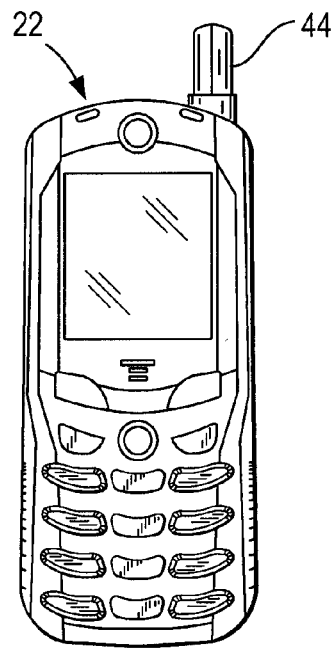
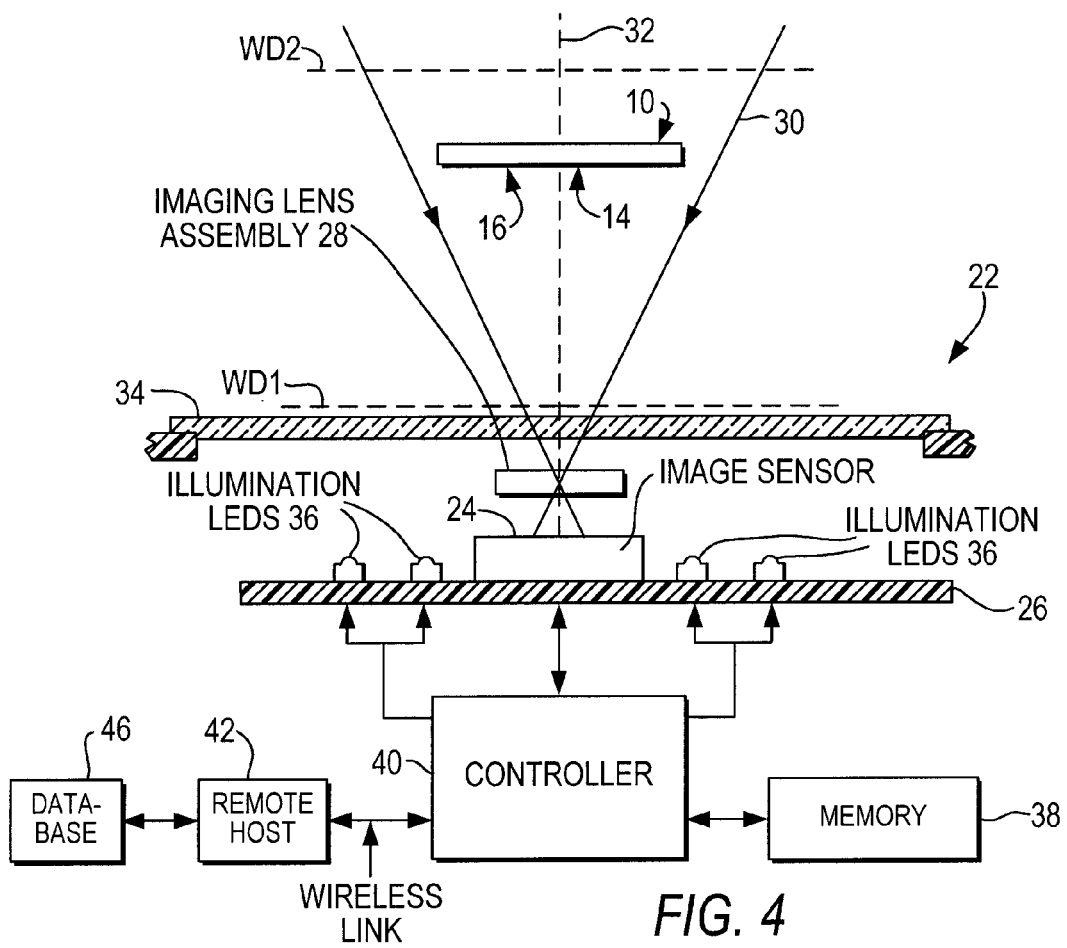
FIG. 3
FIG. 4

METHOD OF, AND SYSTEM AND LABEL FOR, AUTHENTICATING OBJECTS IN SITU

FIELD OF THE DISCLOSURE

The present disclosure relates generally to a method of, and a system and label for, authenticating objects in situ by matching an image pattern of a random distribution of multiple, three-dimensional elements with an authentication pattern signature stored locally with, or remotely from, the object to be authenticated.

BACKGROUND

Counterfeiting impacts virtually all products and transactions worldwide, with concomitant dwindling public trust in product and transaction authenticity. Average consumers typically find it difficult to distinguish between authentic and counterfeit products, because their outside appearances look the same. It has been estimated that 5 to 7% of all world trade involves counterfeiting, and such illicit trade not only costs global economies many billions in currency each year, but also threatens the lives, health and safety of consumers.

Early anti-counterfeiting techniques typically relied on tags or labels that were affixed to products. For example, one- and two-dimensional bar code symbols were printed on such labels, and were read by specialized electro-optical readers for product identification. Radio frequency identification (RFID) tags were affixed to the products, and were interrogated by specialized RFID readers. Magnetic stripes and holograms were affixed to credit, debit and identification cards, and were also read by specialized card readers. Most of these identification techniques, however, were easily duplicated and defeated by counterfeiters. For example, printed bar code symbols and RFID tags can be easily duplicated or copied. Holograms can be reverse-engineered. Magnetic stripe data can be easily read and reused. These identification technologies are generic, and any generic technology can be copied, duplicated or reverse-engineered, thereby compromising their anti-counterfeiting function.

Subsequent anti-counterfeiting techniques typically employ physically unclonable functions (PUF) that exploit the physical properties of disordered structures, i.e., microstructures characterized by an explicitly-introduced randomness or an intrinsic randomness. PUFs use a challenge-response mechanism. When a physical stimulus is applied to the microstructure (called a challenge), the stimulus interacts with the microstructure of the object and provides a response. Since the microstructure depends on the physical factors introduced in manufacturing and is unpredictable, each challenge-response behavior is different and unpredictable, and this property is used by specialized readers in authentication.

Other anti-counterfeiting techniques include biometrics, such as fingerprints or iris scans, color-shifting inks, magnetic inks, molecular markers using microtaggants, tagging powder, DNA markers, or molecular finger prints, etc. Although generally satisfactory for their intended purpose, the known anti-counterfeiting techniques require specialized proprietary readers that work in laboratory settings. Such readers are unavailable to typical users who wish to authenticate an object in the field, e.g., a consumer who wishes to authenticate a retail product before purchase. Even so, reading an attribute of an object to be authenticated with a specialized reader, converting the read attribute to a code, comparing the code to all of a multitude of codes stored in a database, and indicating when a match between codes has been obtained, all takes considerable time, effort and skill, and, in many cases, so much time, effort and skill that a typical consumer does not wish to bother with performing such authentication.

Accordingly, there is a need for a method of, and a system and label for, authenticating objects that can be quickly and reliably performed in the field by an average user without any special skill set, and without resort to specialized readers, and which authentication cannot be readily copied, duplicated or reverse-engineered.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 3 is a front view of a portable, handheld image capture device for use with this invention;

FIG. 4 is a part-sectional, diagrammatic view of image capture components in the device of FIG. 3;

Figure 1:
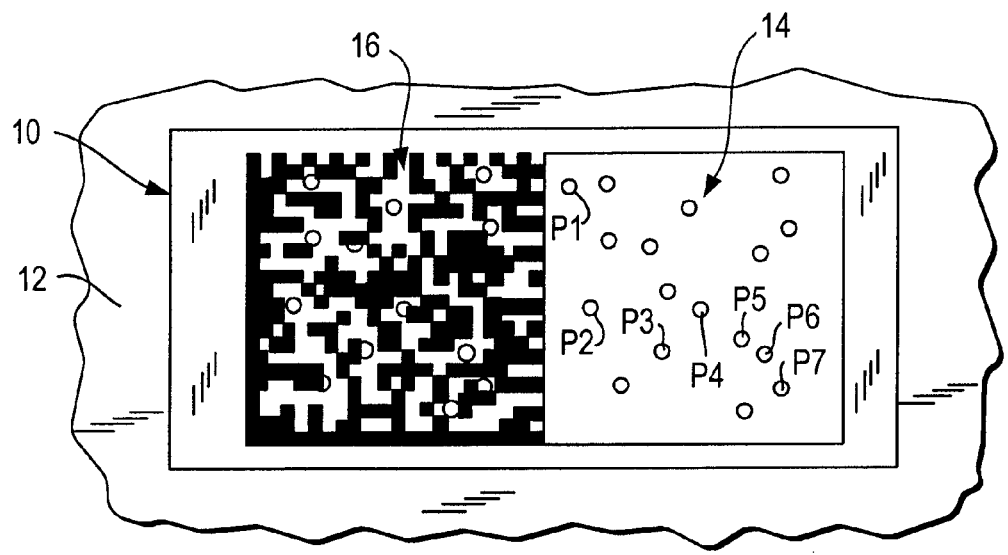
FIG. 1 is a top plan view of a label for authenticating an object in accordance with this invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The system, label and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method of authenticating an object in situ, in accordance with one feature of this invention, comprises creating an authentication pattern signature for the object to be authenticated, associating a random distribution of at least three, three-dimensional elements with the object, aiming a portable, handheld, image capture device at the object to capture return light from the elements as a single image, verifying from the single image that the elements are three-dimensional, processing the single image to generate an image pattern of the elements, comparing the image pattern with the authentication pattern signature, and indicating that the object is authentic when the image pattern matches the authentication pattern signature.

Advantageously, the image capture device is a mobile electronic device having a solid-state imaging module of the type universally found in consumer electronic digital cameras. The mobile electronic device is typically a cellular telephone or smartphone that has a built-in imaging module, but can also be a personal digital assistant (PDA), a tablet, a computer, an e-reader, a media player, or like electronic device having a built-in imaging module, especially one that is normally readily at hand to the average user. No special skill set is required for the user to capture the return light from the three-dimensional elements by simply taking a picture of the three-dimensional elements.

Advantageously, the three-dimensional elements comprise a first dataset configured as a plurality of light-modifying particles and/or bubbles and/or depressions or like structures or combinations thereof that are each sized between 25 microns and 5 millimeters, and preferably between 50 microns and 3 millimeters, and that each can have any shape, color, material, interior structure (hollow or solid), or size. Such three-dimensional elements are large enough to cast shadows and/or have characteristic colors, for subsequent image processing and analysis. The three-dimensional elements are either applied to a label for the object, e.g., by being ink jet-printed on the label, or by being applied in a curable medium on the label, or by being adhered to the label, or by being applied or adhered directly to the object, or by being applied or adhered directly to a card or tag remote from the object, or by being created in or on the object during manufacture. Thus, the term "label" need not be a separate item, but this term also contemplates material directly deposited on or embedded in the object. The light-modifying elements are either optically reflective or retro-reflective, or scattering, or totally absorptive to appear black, or partially absorptive, or multi-spectrally absorptive over one or more different wavelengths to exhibit different colors, and the particles may comprise, but are not limited to, glass beads, kaolin clay particles, calcium carbonate particles, mica particles, or metallic particles, and the elements may comprise, but are not limited to, random imperfections, bubbles or voids.

In one embodiment, the authentication pattern signature for the object is remotely stored in an addressable database remotely from the object. The remote database stores a multitude of other authentication pattern signatures for other objects. A second dataset configured as a plurality of data elements are also associated with the object, preferably by being affixed to the label, e.g., either adjacent to, or superimposed on, the first dataset. The data elements are machine-readable, for example, they can be light-modifying, as described above. When the data elements reflect and absorb light, the same image capture device that captured return light from the first dataset can be used to capture light from the second dataset. The return light from the datasets can be captured simultaneously or consecutively. Advantageously, the second dataset is a one- or two-dimensional bar code symbol printed on the label, but could also be a serial number of alphanumeric characters, or an RFID tag, or a code encoded in a magnetic stripe. The symbol may be comprised of bars, dots, or other shapes and characters. When read, the second dataset serves as an address identifier that identifies an address for the authentication pattern signature in the remote database, thereby enabling the database to be interrogated only at that address, rather than having to interrogate every authentication pattern signature in the database. This greatly accelerates object authentication and improves field performance.

In another embodiment, the authentication pattern signature for the object, or at least part of the authentication pattern signature, is locally stored on the object, preferably as part, or the entirety, of the second dataset on the label. Advantageously, the second dataset is a two-dimensional bar code symbol printed with ink on the label. When the second dataset is read by the same image capture device that read the first dataset, the image pattern is quickly compared with the locally stored part of the authentication pattern signature, thereby even further accelerating object authentication performance. When only part of the authentication pattern signature is locally stored on the object, the remaining part can contain additional information useful for authenticating the authentication pattern signature. Typically, the remote authentication is performed by default, and the local authentication is only performed in the event that access to the remote database is unavailable.

Figure 2:
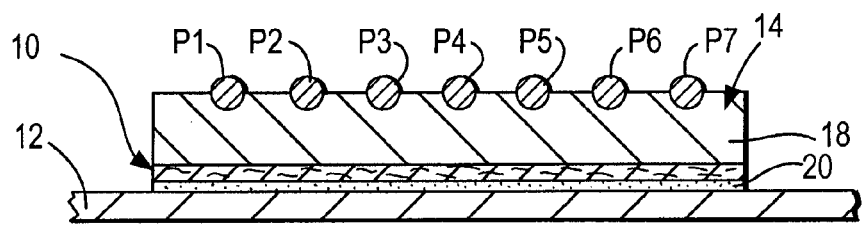
FIG. 2 is a part-sectional, enlarged, side view of the label on the object of FIG. 1.

Turning now to the drawings, reference numeral 10 in FIG. 1 identifies a label for authenticating an object 12 in situ. The label 10 is associated with the object 12 to be authenticated, and any object may be authenticated. Preferably, the label 10 has a substrate, e.g., paper, foil, or film, and an adhesive layer 20 (FIG. 2) on the underside of the substrate for adhering the label 10 to the object 12. The substrate may be of one-piece or multi-partite design. The label 10 includes a first dataset 14 configured as a random distribution of a multitude of three-dimensional elements, e.g., at least three, and preferably more, representative elements P1-P7 in FIGS. 1-2, affixed on the label substrate. The three-dimensional elements P1-P7 are light-modifying particles and/or bubbles and/or depressions and/or like structures and/or combinations thereof that are each sized between 25 microns and 5 millimeters, and preferably between 50 microns and 3 millimeters, and that are each sufficiently large to cast shadows on the substrate or the object for image analysis, as described below. The light-modifying elements are either optically reflective or retro-reflective, or scattering, or totally absorptive to appear black, or partially absorptive, or multi-spectrally absorptive over one or more different wavelengths to exhibit different colors, and the particles may comprise, but are not limited to, glass beads, kaolin clay particles, calcium carbonate particles, mica particles, or metallic particles, and the elements may comprise, but are not limited to, random imperfections, bubbles or voids.

Although illustrated as spherical, the three-dimensional elements P1-P7 can have any shape, color, material, interior structure (hollow or solid), or size. The three-dimensional elements P1-P7 may be ink jet-printed on the label substrate, or mixed in a viscous, curable medium 18 and the mixture spread on the label substrate for curing, or by being adhered directly to the label substrate or the object 12, or by being applied adhered directly to a card or tag remote from the object 12. Although illustrated as occupying a square area on the label 10, the three-dimensional elements P1-P7 can occupy different geometrical areas, such as rectangular, triangular, circular, or oval areas, on the label substrate. Although illustrated as occupying a minor fraction of the area on the label substrate, the three-dimensional elements P1-P7 can cover and occupy an area from less than 1% to 100% coverage of the first dataset area on the label substrate. The three-dimensional elements P1-P7 can be mutually spaced apart or contact one another. The three-dimensional elements P1-P7 can be deposited in a single layer or in multiple layers on the label substrate. Although illustrated in FIG. 2 as being partially embedded in the medium 18, the three-dimensional elements P1-P7 can be fully embedded therein, and indeed may be overlaid with a transparent overcoat for protection.

FIG. 1 also shows that the label 10 includes a second dataset 16 configured as a plurality of data elements. As illustrated, the second dataset 16 is a two-dimensional bar code symbol, e.g., a Datamatrix code, printed with ink on the label substrate, with some of the data elements being light-absorbing (black), and others of the data elements being light-reflective (white). The second dataset need not be the two-dimensional bar code symbol as illustrated, but could be any other two-dimensional bar code symbol, e.g., a portable document format (PDF417) symbol, or a one-dimensional symbol, such as a universal product code (UPC) symbol, or a truncated symbol, or a stacked symbol, or could be a serial number composed of alphanumeric characters, or an RFID tag, or a code encoded in a magnetic stripe. The printed symbol may be comprised of bars, dots, or other shapes and characters. The first and second datasets 14, 16 can be applied anywhere on the label substrate and/or object, for example, to distinct areas adjacent each other on the label substrate, or they can partially overlap each other on the label substrate, as illustrated in FIG. 1, or they can completely overlap each other on the label substrate, or they can be at different places from each other.

Reference numeral 22 in FIGS. 3-4 generally identifies a handheld, portable, image capture device having a built-in imaging module (FIG. 4) of the type universally found in consumer electronic digital cameras. As illustrated, the device is a cellular telephone or smartphone that has a built-in imaging module. It will be understood that other mobile electronic devices, such as personal digital assistants (PDAs), tablets, computers, e-readers, media players, or like electronic devices having such modules, especially those normally readily at hand to average users, could be employed to capture return light from the label 10 in accordance with this invention.

As shown in FIG. 4, the imaging module in the device 22 includes an image sensor 24 operable at a frame rate of multiple frames per second, and mounted on a printed circuit board (PCB) 26, and an imaging lens assembly 28 mounted in front of the image sensor 24. The image sensor 24 is a solid-state device, for example, a two-dimensional charge coupled device (CCD) or a complementary metal oxide semiconductor (CMOS) device, and has an area array of addressable photocells or pixels, preferably of submegapixel or supermegapixel size, having a reading field of view 30 that diverges away from a window 34 in both horizontal and vertical directions. The window 34 is supported on either a front or a back wall of the device 22. The imaging lens assembly 28 has an optical axis 32 generally perpendicular to the image sensor 24 and is operative for capturing return light through the window 34 from the label 10 of FIG. 1 that is located in a range of working distances along the optical axis 32 between a close-in working distance (WD1) and a far-out working distance (WD2), and for projecting the captured return light onto the image sensor 24. In a preferred embodiment, WD1 is about one inch from the image sensor 24 and generally coincides with the window 34, and WD2 is about twelve inches or more from the window 34.

As also shown in FIG. 4, an illumination light system is also mounted in the device 22 and preferably includes a plurality of illumination light sources, e.g., two pairs of light emitting diodes (LEDs) 36, mounted on the PCB 26 and arranged at opposite sides of the image sensor 24 to uniformly illuminate the first and second datasets 14, 16 on the label 10 with illumination light. The illumination light is preferably in the visible range of wavelengths, but could also be in the infrared (IR) or the ultraviolet (UV) range of wavelengths.

FIG. 4 also shows that the image sensor 24 and the illumination LEDs 36 are operatively connected to a controller or programmed microprocessor 40 on-board the device 22 and operative for controlling the operation of all these electrical components. An on-board memory 38, either internal to or external of the controller 40, is accessible to the controller 40. A remote host server 42 located remotely from the device 22 is operatively connected to the controller 40, typically via a wireless link transmitted by an antenna 44 (see FIG. 3) and to a remote database 46. As described below, the controller 40 is also operative for processing the return illumination light scattered and/or reflected from the label 10 and for performing authentication of the object 12. It will be understood that the capture of the return light also encompasses the capture of no or little return light, which occurs when all or most of the light incident on a light-modifying element (e.g., a black element or a depression) is fully or mostly absorbed.

Figure 5:
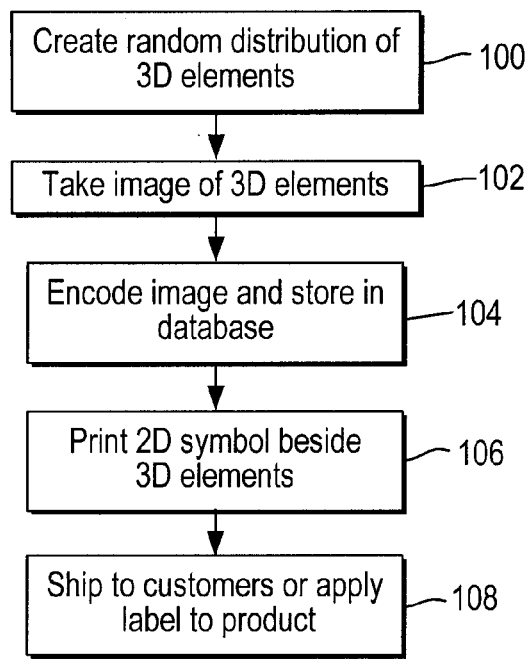
FIG. 5 is a flow chart depicting steps in the making of the label.

FIG. 5 is a flow chart depicting steps in the making of the label 10. In step 100, a random distribution of multiple, three-dimensional elements P1-P7 is created on the label 10 as the first dataset 14. In step 102, an image of the random distribution is captured by the manufacturer. In step 104, the captured image is encoded as an authentication pattern signature and stored in a database, e.g., the remote database 46 accessible to the remote host server 42, or a local database on the label 10. The remote database 46 typically has a multitude of stored authentication pattern signatures, each one being located at a unique address. In step 106, a plurality of data elements is created on the label 10 as the second dataset 16, for example, a two-dimensional symbol is printed on the label. The two-dimensional symbol is encoded with an address to locate the authentication pattern signature at that address, and/or with a part of, or the entirety of, the authentication pattern signature, and/or with additional authentication information. In step 108, the manufacturer applies the label 10 to the object, or ships a supply of the labels to others to apply the labels 10 to the objects. The sequence of these steps could be changed.

Figure 6:
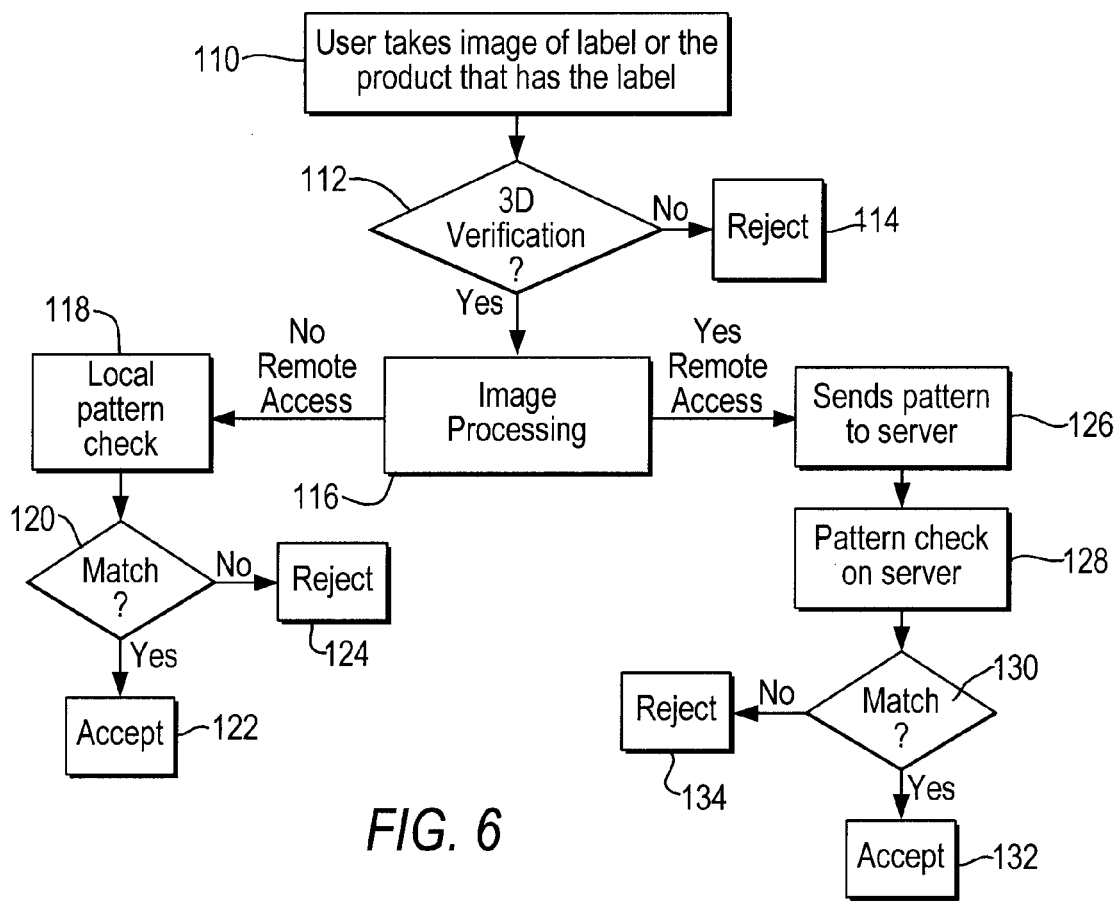
FIG. 6 is a flow chart depicting steps in the authentication of the object.

FIG. 6 is a flow chart depicting steps in the authentication of the object 12. In step 110, a user seeking to authenticate the object 12 takes a picture of the label 10 or of the labeled object 12 by operating the device 22, e.g., by depressing a key on the keypad, or depressing a dedicated button, or by tapping a display screen, or by voice command. No special skill set is required and, of course, such a mobile device 22 is typically carried on one's person at all times and is readily at hand. In verification step 112, the user may inspect the first dataset 14 to verify that the three-dimensional elements are indeed three-dimensional. This inspection can be manually done, either before or after step 110, by passing one's finger across the three-dimensional elements, preferably when the three-dimensional elements are raised on the label 10 by being only partially embedded thereon, to tactilely sense the presence of the three-dimensional elements, or visually, preferably when the three-dimensional elements are not raised above the label 10 and are fully embedded therein. The verification step 112 also includes having the controller 40 automatically verify, as described more fully below, that the three-dimensional elements are indeed three-dimensional by evaluating, for example, the shadow S (see FIG. 7) cast by each three-dimensional element P that is preferably illuminated by the illumination light L. If the manual and/or automatic inspection fails, then the three-dimensional verification is rejected in step 114. If the verification is successful, then the captured image is processed, as described more fully below, in image processing step 116 to compare an image pattern. The sequence of these steps could be changed.

As described previously, the image pattern is remotely authenticated, typically by default. When the second dataset 16 is encoded with an address identifier, then the controller 40 sends the image pattern captured by the device 22 to the remote host server 42 to extract the address for the authentication pattern signature in step 126. In step 128, the remote host server 42 interrogates the remote database 46 with the extracted address. If there is a match in step 130, then the authentication is accepted in step 132; otherwise, the authentication is rejected in step 134. Some of these steps could be combined.

If access to the remote host server 42 is not available, then the image pattern generated in step 116 can be locally authenticated by the controller 40. When the second dataset 16 is encoded with part, or the entirety, of the authentication pattern signature, then the controller 40 compares the image pattern of the three-dimensional elements captured by the device 22 with the locally stored part of the authentication pattern signature in step 118. If there is a match in step 120, then the authentication is accepted in step 122; otherwise, the authentication is rejected in step 124.

Figure 7:
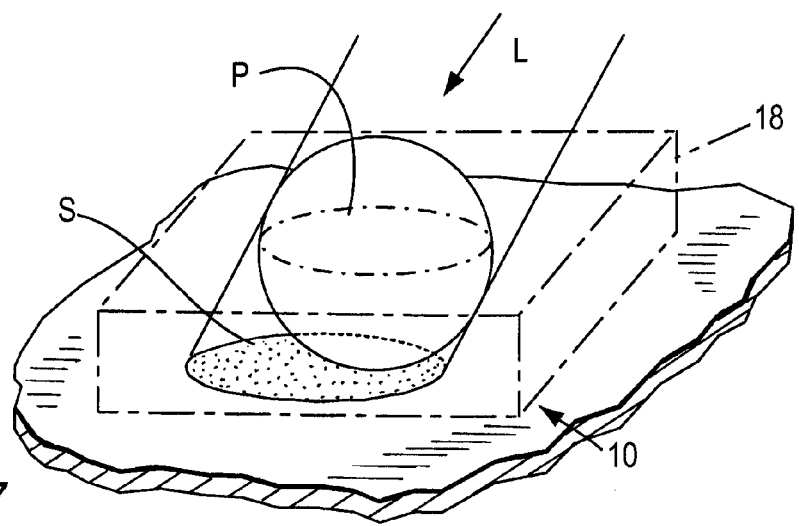
FIG. 7 is an enlarged, perspective view of a three-dimensional element casting a shadow for use in image analysis.

The controller 40 automatically verifies, in step 112, the three-dimensional nature of the first dataset 14 by processing a verification algorithm that determines the shape of the elements P from the shadow or shading S of FIG. 7. The shadow S is cast either on the label substrate, or on the object when no label is used. Details of this verification algorithm can be found, for example, by reference to "Shape and Source from Shading", Proceedings of International Joint Conference on Artificial Intelligence, pp. 932-936, 1985, by Brooks et al., the contents of which are hereby incorporated herein by reference thereto.

The three-dimensional nature of the first dataset 14 can also be verified from image intensity. The verification algorithm can be applied to verify if the input image is a real three-dimensional structure captured in the field, or a forged two-dimensional image. In the latter case, the image intensity is the composition of two pieces of information, one is the intensity of the original image, and the other is the intensity caused by the lighting condition when taking the original image. When the verification algorithm cannot get a meaningful image geometry, the input image is counterfeit. If the input image is a scanned copy of the original image, then the scanning process will cause information loss. The loss of information renders the verification algorithm unable to recover the original image.

The controller 40 automatically processes and decodes the three-dimensional elements of the first dataset 14 encoded with the authentication pattern signature into the image pattern by processing an image processing or decoding algorithm in step 116. For example, the coding scheme can include both a single element pattern and a global element pattern. The single element pattern assigns each element a unique identifier and signature depending on such characteristics as color, size, shape, and internal structure, and sorts all the signatures together to form a string. The global element pattern determines the center positions and the sizes of the elements, and the relative positions between the element centers to generate a combinatorial graph, which is invariant under translation, rotation, perspective deformation, or tilt or curvature of the label. The authentication pattern signature is the concatenation of the single and global element patterns.

The image processing algorithm converts the random distribution of three-dimensional elements to abstract combinatorial graphs, which encode only the connectivity among the three-dimensional elements. Thus, the image processing algorithm initially removes the background from the captured image and, thereupon, connects the geometric centers or nodes of the extracted elements by lines to form triangles in accordance with Delaunay triangulation such that each triangle does not circumscribe or include a node therein. This method is much more robust to any distortions introduced by, for example, changing of viewing angles, changing of viewing distances, different focal lengths of the imaging lens assemblies of different image sensors, curved object surfaces, curved labels, and unstable media. These distortions will drastically change the geometric center locations of the three-dimensional elements and, therefore, an authentication method based solely on geometric center positions will be vulnerable to error. By contrast, any such distortions will not substantially affect the connectivity, i.e., the line structure, among the three-dimensional elements and, therefore, the combinatorial graph structure remains the same even in the presence of such distortions.

It is well known that verifying whether two graphs are isomorphic is a non-deterministic, polynomial-time, hard (NP-hard) problem, which is essentially unsolvable. In accordance with this invention, a unique Riemannian metric is assigned to the abstract combinatorial graph. Thus, the topological problem has been converted into a geometric problem, which is solvable using Riemannian geometry.

Thus, the random distribution is represented as a combinatorial graph in a plane. By conformal mapping geometry theory, the combinatorial graph can be realized on a unit sphere. A special realization (embedding) can be computed using the Ricci flow method, which is unique up to the so-called Mobius transformation. The embedding has unique properties. Each node of the combinatorial graph is associated with a circle, each triangular face of the combinatorial graph is associated with a circle as well. If two nodes are connected by an edge or line on the combinatorial graph, then the corresponding node circles are tangent to each other on the unit sphere. However, if a node belongs to a triangular face, then the corresponding node circle is orthogonal to the face circle. In this way, the combinatorial graph is assigned a geometric structure, i.e., the Riemannian metric, which can be utilized to match two graphs efficiently and accurately.

There are other alternative methods to encode and decode authentication information for random three-dimensional structures. For example, the random three-dimensional structure can be arranged in a regular n×n grid of cells. Inside each cell of the grid, the presence or absence of each element is noted. Each element can be translated to a binary code. The grid cells are ordered in a sequence. If there is an element in the k-th cell, then the k-th bit of the binary code is set to be one; otherwise, if the k-th cell is empty, then the k-th bit of the binary code is set to be zero. Then, the random distribution and the binary code has a one-to-one correspondence. The regular grid can be replaced by other general planar tessellations, such as a regular triangulation, or a hexagonal tessellation, or a circular tessellation, etc.

Another example of a method to encode and decode authentication information for random three-dimensional structures is to directly compare random patterns or colors. For example, the images may be processed using histogram equalization to reduce the effect of illumination. Then, a Gabor filter, a local binary pattern (LBP), or a scale-invariant feature transform (SIFT) can be used to compute local features. By matching local features, a projective transformation is determined. The input image is transformed by the projective transformation. Then, finally, two images are compared using the least power (Lp) norm distance between the images. These direct image comparison techniques are also equally applicable to compare stored images to captured images in the field.

In accordance with another feature of this invention, a system for authenticating an object in situ, comprises an authentication pattern signature for the object to be authenticated, a random distribution of at least three, three-dimensional elements associated with the object, a portable, handheld, image capture device for aiming at the object to capture return light from the elements as a single image, and a processor for verifying from the single image that the elements are three-dimensional, for processing the single image to generate an image pattern of the elements, for comparing the image pattern with the authentication pattern signature, and for indicating that the object is authentic when the image pattern matches the authentication pattern signature.

In accordance with still another feature of this invention, a label for authenticating an object in situ to which the label is associated, comprises a label substrate, a first dataset configured as a random distribution of at least three, three-dimensional elements on the label substrate, and a second dataset configured as data elements on the label substrate. The three-dimensional elements are light-modifying to enable a portable, handheld, image capture device aimed at the label to capture return light from the three-dimensional elements to verify that the three-dimensional elements are three-dimensional, and to process the captured return light to generate an image pattern of the three-dimensional elements for comparison with an authentication pattern signature. The data elements are machine-readable to assist in the comparison of the authentication pattern signature.

In another embodiment, DNA derived, for example, from plant-based materials can be mixed in with the ink used in the printing of the second dataset 16, when the second dataset 16 is configured as a printed symbol, or DNA ink/material can be deposited anywhere on the label or the object to complement the authentication described herein. This DNA serves as a unique identifier, for example, to identify the source or manufacturer of the object 12.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, or contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A method of authenticating an object in situ, comprising:
creating an authentication colored pattern signature for the object to be authenticated;
randomly distributing a plurality of three-dimensional, colored elements on a label;
affixing the colored elements on the label such that outer portions of the colored elements are raised and elevated above the label;
applying the label with the raised, colored elements on the object;

aiming a portable, handheld, image capture device at the label on the object to capture return light from the raised, colored elements on the label;

verifying that the raised, colored elements on the label are indeed three-dimensional based on the elevation of the raised, colored elements relative to the label;

processing a colored image pattern of the raised, colored elements on the label;

comparing the colored image pattern with the authentication colored pattern signature; and indicating that the object is authentic when the colored image pattern matches the authentication colored pattern signature.

2. The method of claim 1, wherein the creating is performed by remotely storing the authentication colored pattern signature in an addressable database remotely from the object; and associating an address identifier with the object; and reading the address identifier to obtain an address for the authentication colored pattern signature; and wherein the comparing is performed by interrogating the database with the address.

3. The method of claim 2, wherein the associating of the address identifier is performed by applying the address identifier to the object.

4. The method of claim 3, wherein the applying of the address identifier is performed by printing a code on the label affixed on the object.

5. The method of claim 4, wherein the affixing of the raised, colored elements is performed by affixing the raised, colored elements adjacent to the printed code on the label.

6. The method of claim 4, wherein the affixing of the raised, colored elements is performed by superimposing the raised, colored elements on the printed code on the label.

7. The method of claim 1, wherein the affixing of the raised, colored elements is performed by mixing the raised, colored elements in a mixture, and by applying the mixture on the label.

8. The method of claim 1, and configuring the raised, colored elements of at least one of light-modifying particles, bubbles, depressions and structures that are each sized between 25 microns and 5 millimeters, and occupying a coverage area of the raised, colored elements of less than 1% to 100% on the label.

9. The method of claim 1, and configuring the raised, colored elements of at least one of light-modifying particles, bubbles, depressions and structures of any shape, color, material, interior structure, and size.

10. The method of claim 1, wherein the creating is performed by locally storing at least part of the authentication colored pattern signature on the label; and wherein the comparing is performed by comparing the colored image pattern with the stored part of the authentication colored pattern signature.

11. The method of claim 1, wherein the creating is performed by locally storing at least part of the authentication colored pattern signature on the label; and locally storing additional authentication information on the label; and wherein the comparing is performed by comparing the colored image pattern with the stored part of the authentication colored pattern signature and with the stored additional authentication information.

12. The method of claim 1, wherein the return light is captured by a solid-state image sensor supported by the portable image capture device that is held by a user during authentication.

13. The method of claim 1, wherein the verifying is initially performed by manual inspection by a user of the raised, colored elements, and is subsequently performed by automatic image analysis of shadows of the raised, colored elements.

14. The method of claim 1, wherein the processing is performed by analyzing connectivity among the raised, colored elements.

* * * * *